United States Patent
Earle

(10) Patent No.: US 9,963,915 B1
(45) Date of Patent: May 8, 2018

(54) SWITCH CABLE LOCK AND METHOD OF USE

(71) Applicant: John R. Earle, Churchton, MD (US)

(72) Inventor: John R. Earle, Churchton, MD (US)

( * ) Notice: Subject to any disclaimer, the term of this patent is extended or adjusted under 35 U.S.C. 154(b) by 0 days. days.

(21) Appl. No.: 15/585,532

(22) Filed: May 3, 2017

(51) Int. Cl.
| | |
|---|---|
| *E05B 73/00* | (2006.01) |
| *E05B 65/00* | (2006.01) |
| *E05B 67/00* | (2006.01) |

(52) U.S. Cl.
CPC ........ *E05B 73/0005* (2013.01); *E05B 65/006* (2013.01); *E05B 67/003* (2013.01)

(58) Field of Classification Search
CPC ... E05B 73/0005; E05B 65/006; E05B 67/003
USPC ..... 70/14, 16, 58, 30, 49, 52, 173, 164–168, 70/182–186
See application file for complete search history.

(56) References Cited

U.S. PATENT DOCUMENTS

| | | | | |
|---|---|---|---|---|
| 127,794 | A * | 6/1872 | Ransom et al. | ........ E05C 19/18 |
| | | | | 292/288 |
| 1,401,971 | A * | 1/1922 | Faison | ............... B60R 25/09 |
| | | | | 70/15 |
| 2,508,795 | A * | 5/1950 | Nielsen | ........... A47C 31/08 |
| | | | | 294/152 |
| 3,838,585 | A | 10/1974 | Foote | |
| 3,886,770 | A | 6/1975 | Smith | |
| 3,965,709 | A * | 6/1976 | Belke | ................ B62H 5/003 |
| | | | | 70/227 |
| 4,325,238 | A * | 4/1982 | Scherbing | ............. E05B 67/003 |
| | | | | 70/18 |
| 4,526,125 | A * | 7/1985 | Bain, Jr. | ............... E05B 73/007 |
| | | | | 114/172 |
| 4,529,240 | A | 7/1985 | Engel | |
| 4,570,465 | A | 2/1986 | Bennett | |
| 4,705,281 | A * | 11/1987 | Spinas | ................. A63C 11/026 |
| | | | | 224/917 |
| 4,765,521 | A * | 8/1988 | Finnegan | ................ B60R 9/048 |
| | | | | 224/315 |
| 4,850,207 | A | 7/1989 | Ylven | |
| 4,867,478 | A | 9/1989 | Anderson | |
| 5,197,310 | A * | 3/1993 | Pedersen | ................ B62H 5/003 |
| | | | | 70/227 |
| 5,335,835 | A * | 8/1994 | Hogan | ..................... A45F 3/14 |
| | | | | 224/257 |
| 5,351,507 | A | 10/1994 | Derman | |
| 5,408,212 | A | 4/1995 | Meyers et al. | |
| 5,622,066 | A * | 4/1997 | Shallis | ................. B62H 5/001 |
| | | | | 70/18 |

(Continued)

*Primary Examiner* — Suzanne L Barrett
(74) *Attorney, Agent, or Firm* — Whiteford, Taylor & Preston, LLP; Gregory M. Stone

(57) ABSTRACT

Disclosed is a cable lock particularly configured for securing the cover of a control switch, such as a fluid flow or pressure switch used in industrial pressurized air and water delivery systems that include a fluid line tap, a base, a flow or pressure switch mounted on the base, and a switch cover removably attached to the base and covering the switch. The cable lock is specially configured with a first loop portion that wraps around the fluid line tap, and a second loop portion attached to the first loop portion and positioned at approximately 90° to the first loop portion that wraps around the switch cover so as to prevent unauthorized removal of the cover and unauthorized access to the switch.

6 Claims, 4 Drawing Sheets

(56) References Cited

U.S. PATENT DOCUMENTS

| | | | |
|---|---|---|---|
| 5,706,680 A * | 1/1998 | Wroble | A63C 11/004 211/4 |
| 5,829,443 A * | 11/1998 | Cunningham | A61F 5/3715 128/869 |
| 5,937,678 A | 8/1999 | Kuo | |
| 6,006,555 A | 12/1999 | Shu-Fen | |
| 6,109,074 A | 8/2000 | Du | |
| 6,430,973 B1 | 8/2002 | Huang | |
| 6,701,757 B1 | 3/2004 | Vito | |
| 6,966,205 B2 | 11/2005 | Devecki | |
| 7,131,298 B1 | 11/2006 | Haraughty | |
| 8,002,232 B2 * | 8/2011 | Meislahn | B60R 25/00 248/317 |
| 8,061,750 B1 * | 11/2011 | Hamilton | A45C 13/30 294/149 |
| 8,596,099 B1 * | 12/2013 | Eldred | E05B 73/0005 70/14 |
| 9,334,678 B2 * | 5/2016 | Allen | E05B 67/003 |
| 9,447,611 B2 | 9/2016 | Conti et al. | |
| 9,816,296 B2 * | 11/2017 | Denny | E05B 73/0005 |
| 2001/0031588 A1 * | 10/2001 | Young | E05B 73/007 441/74 |
| 2003/0089142 A1 * | 5/2003 | Boni | A63C 11/02 70/18 |
| 2005/0199018 A1 * | 9/2005 | Chen | E05B 67/003 70/18 |
| 2005/0235710 A1 * | 10/2005 | Ling | E05B 73/0082 70/58 |
| 2007/0256844 A1 | 11/2007 | Blasing et al. | |
| 2008/0072633 A1 | 3/2008 | Samuel | |
| 2012/0137741 A1 * | 6/2012 | Yu | B62H 5/003 70/53 |
| 2012/0210755 A1 * | 8/2012 | Shafer | E05B 73/0005 70/15 |
| 2013/0174616 A1 | 7/2013 | Allen, Jr. | |
| 2016/0348403 A1 | 12/2016 | Denny | |
| 2017/0292295 A1 * | 10/2017 | Alvarado | E05B 71/00 |

* cited by examiner

SWITCH CABLE LOCK AND METHOD OF USE

FIELD OF THE INVENTION

The present invention relates to locks, and more particularly to locks for preventing the unauthorized access to covered fluid flow or pressure switches mounted to fluid supply lines, and methods of their use.

BACKGROUND OF THE INVENTION

Pressurized fluid delivery systems are used in a wide variety of industrial applications. By way of non-limiting example, sprinkler systems are often installed in industrial buildings for fire protection purposes. Such sprinkler systems are often equipped with flow or pressure sensors positioned at various points in the distributed flow system, which sensors may automatically detect and generally manage the flow of fluid through the system, and may initiate alarms in the event that a particular alarm event is triggered. For example, in the event of a fire at an industrial facility, the sprinkler system may be equipped with mechanisms that automatically detect the fire and automatically activate the sprinkler system. Flow or pressure sensors in the system may detect the increased fluid flow, and may automatically signal an alarm to, for example, call the fire department or other personnel to combat the fire. Such flow or pressure sensors typically comprise a switch having a water flow detector, which is an electro-mechanical device designed to send an alarm to a fire alarm panel and/or a fire department when a continuous flow of water occurs through the fire sprinkler system's piping as a result of an activated fire sprinkler head. A portion of an exemplary industrial sprinkler system is shown in FIG. 1, including a fluid riser 10 and a flow or pressure switch 20 positioned on the riser.

FIG. 2 is a close-up view of an exemplary flow or pressure switch 20 of traditional configuration, and includes a cover 22, a base 24, and a fluid line tap 26. The cover 22 may be attached to base 24 by screws or similar fasteners.

Such industrial fluid delivery systems require periodic maintenance. Unfortunately, there are service personnel that, from time to time when servicing such systems, interfere with the operation of the flow or pressure switches so as to ensure that an alarm condition is not triggered while they are performing their intended service. More particularly, as the flow or pressure switch 20 is typically connected to a supervised fire alarm or monitoring panel that automatically calls the fire department when activated, often service personnel attempt to disable the flow or pressure switches 20 so that they may perform the intended service without interference. Such service personnel may not have access to the fire alarm or monitoring panel, and may lack the knowledge or authority that would be required to temporarily disable the alarm (account numbers, passwords, etc.), but are nonetheless tasked with performing the needed service as quickly as possible. It has become a not uncommon practice for certain service personnel to break off portions of the flow or pressure switch 20 assembly so as to be able to remove cover 22 from base 24, allowing access to the switch activator which they may then manually manipulate and block from moving. This allows the service personnel to drain and refill the sprinkler system without triggering an alarm. However, such practice creates multiple problems. First, damage done to remove cover 22 from base 24 results in cover 22 no longer fitting on base 24, or at a minimum not properly fitting on base 24, thus exposing switch 20 to weather, moisture, and the like. Second, in order to repair such a damaged flow or pressure switch 20, the property owner or other responsible party is faced with an expense of potentially $500 per switch. Third, inoperative flow and pressure switches will fail to automatically dispatch the fire department in a fire emergency and could create a life threatening situation.

Thus, there is a need in the art for a mechanism that would prevent unauthorized access to flow or pressure switches on pressurized fluid delivery systems, but that is easy to install and remove, and of sufficiently simplistic construction to be manufactured at low cost so that it may be affordably deployed on systems having large numbers of such flow or pressure switches.

SUMMARY OF THE INVENTION

Disclosed herein is a cable lock for a control switch, such as a flow or pressure switch, and more particularly for locking a removable cover to the base of the switch assembly. In accordance with certain aspects of an embodiment of the invention, a multi-loop cable lock is provided having a first loop portion sized to wrap around the fluid line tap head of the switch assembly and below the base of such assembly, and a second loop portion positioned at approximately 90° to the first loop portion and sized to wrap around the cover of the switch assembly. A key lock is provided on the first loop portion to allow installation and locking of the first loop portion about the fluid line tap head after the second loop portion has been positioned to overlap the cover and base of the switch assembly.

In accordance with certain aspects of an embodiment of the invention, a switch cable lock is provided comprising: a first loop portion having a first loop first end, a first loop second end, and a midpoint between the first loop first end and the first loop second end, and a lock; a second loop portion permanently affixed to the first loop portion and situated at a 90° angle to the first loop portion, the second loop portion having a second loop first end attached to the first loop portion at a point between the midpoint and the first loop first end, and the second loop portion having a second loop second end attached to the first loop portion at a point between the midpoint and the first loop second end.

In accordance with further aspects of an embodiment of the invention, a method of locking a cover of a switch to a base of a switch is provided, comprising the steps of: providing a switch cable lock comprising a first loop portion having a first loop first end, a first loop second end, and a midpoint between the first loop first end and the first loop second end, and a lock; and a second loop portion permanently affixed to the first loop portion and situated at a 90° angle to the first loop portion, the second loop portion having a second loop first end attached to the first loop portion at a point between the midpoint and the first loop first end, and the second loop portion having a second loop second end attached to the first loop portion at a point between the midpoint and the first loop second end; positioning the second loop portion around a cover of a flow or pressure switch, such that the second loop portion extends across a first side of the cover, a top side of the cover, and a second side of the cover opposite the first side; wrapping the first loop portion around a fluid line tap head of the flow or pressure switch; and locking the first loop portion around the fluid line tap head so that the first loop portion is immediately adjacent a base of the flow or pressure switch.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
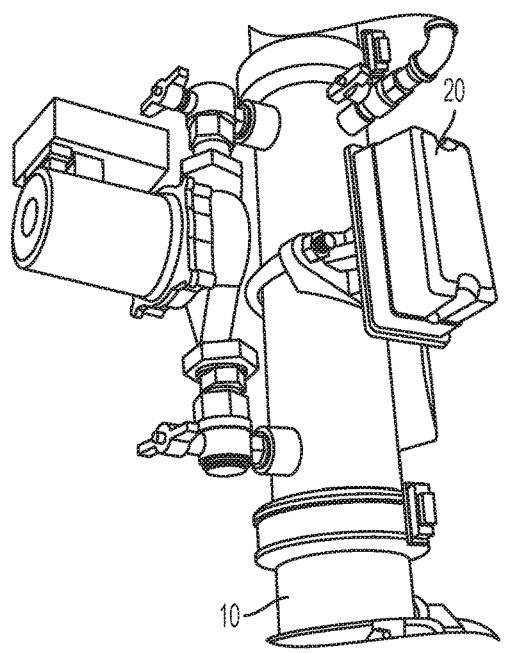
FIG. 1 is a schematic view of a prior art sprinkler system equipped with fluid flow and/or pressure switches.
Figure 2:
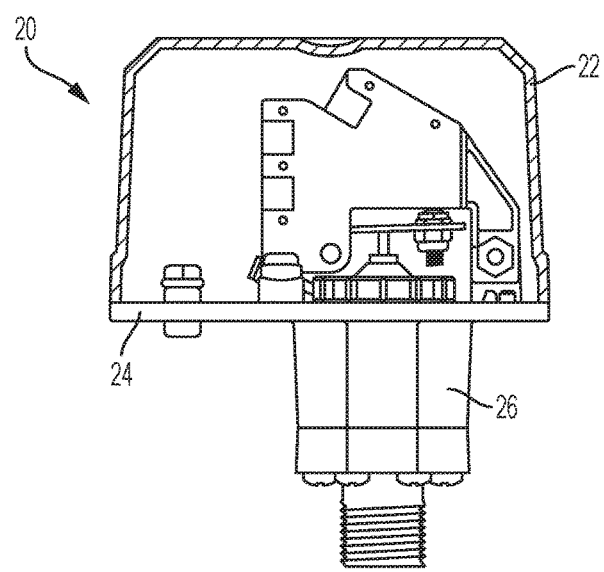
FIG. 2 is a schematic view of a prior art flow or pressure switch for use with the sprinkler system of FIG. 1.
Figure 3:
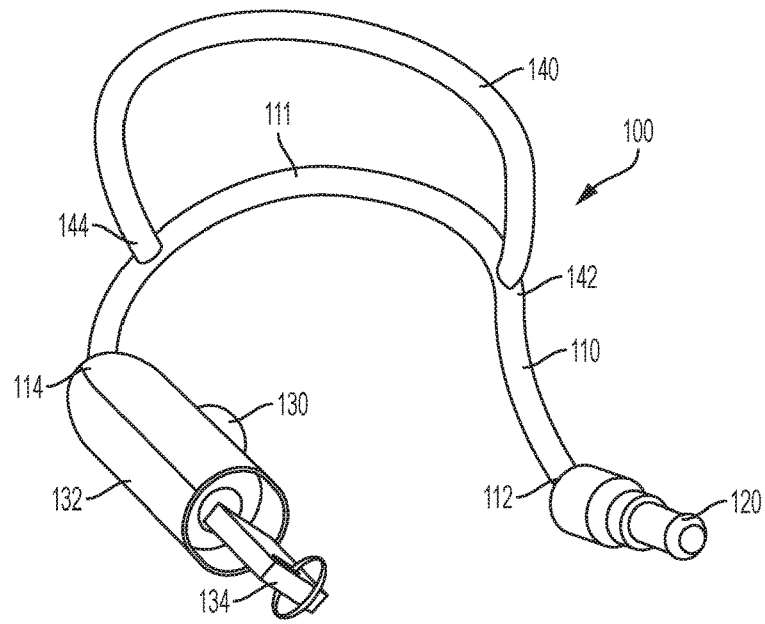
FIG. 3 is a top perspective view of a switch cable lock in accordance with certain aspects of an embodiment of the invention.

FIG. 3 shows a top perspective view of a cable lock 100 in accordance with certain aspects of an embodiment of the invention. Cable lock 100 may be formed, by way of non-limiting example, of semi-flexible steel cable, KEVLAR, or other such material as will be difficult to cut or break apart without significant, deliberate, cutting-tool-aided effort. Cable lock 100 includes first loop portion 110 comprising a length of cable having a first end 112 and a second end 114. A lock head 120 is affixed to first end 112 of first loop portion 110, and a lock head receiver 130 is affixed to second end 114 of first loop portion 110. Lock head receiver 130 includes a lock assembly 132 configured to receive and hold lock head 120 when positioned therein and until unlocked, such as by way of a key 134. Lock head 120, lock head receiver 130, and lock assembly 132 are of well-known construction to those of ordinary skill in the art, and thus are not further described here. It is noted, however, that lock head 120 may take any of a wide variety of shapes, and lock assembly may be engaged via a key 134, a combination lock, or such other lock assembly as will be readily apparent to those of ordinary skill in the art.

Figure 4:
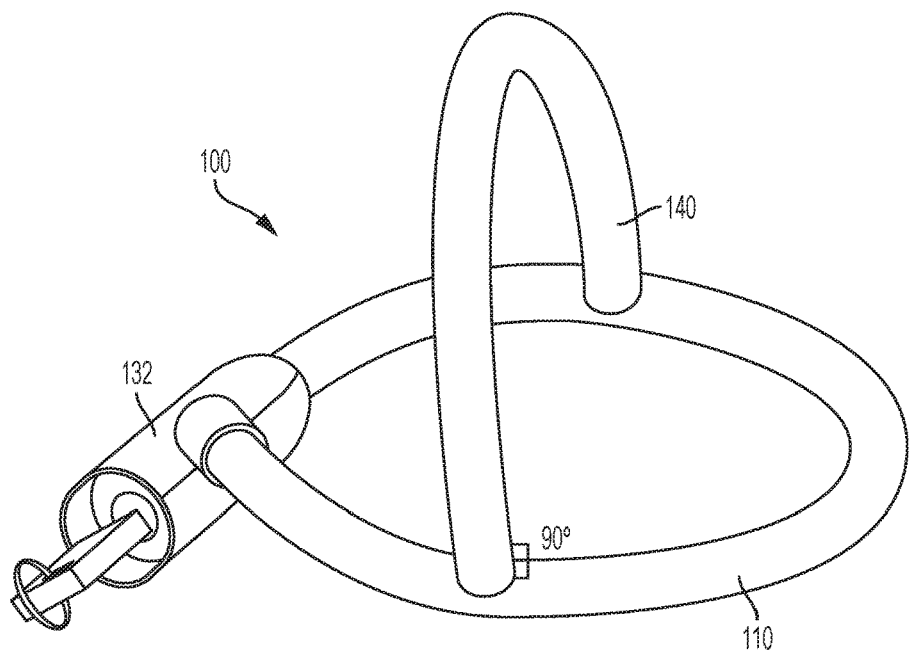
FIG. 4 is a side perspective view of the switch cable lock of FIG. 3 in a locked condition.

Cable lock 100 also includes a second loop portion 140 having a first end 142 and a second end 144. First end 142 of second loop portion 140 is preferably permanently affixed to first loop portion at a location between a midpoint 111 of first loop portion 110 and first end 112 of first loop portion 110. Likewise, second end 144 of second loop portion 140 is preferably permanently affixed to first loop portion at a location between midpoint 111 of first loop portion 110 and second end 114 of first loop portion 110. Moreover, and as shown in the side perspective view of cable lock 100 of FIG. 4, second loop portion 140 is attached to first loop portion 110 so as to extend in a direction that is 90° to a plane containing first loop portion 110.

Figure 5A:
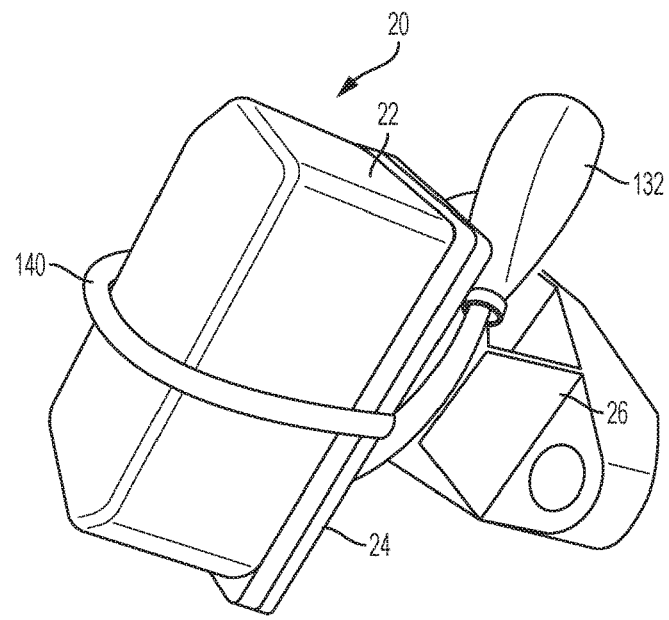
FIG. 5A is a top perspective view of the switch cable lock of FIG. 3 installed on a flow or pressure switch.
Figure 5B:
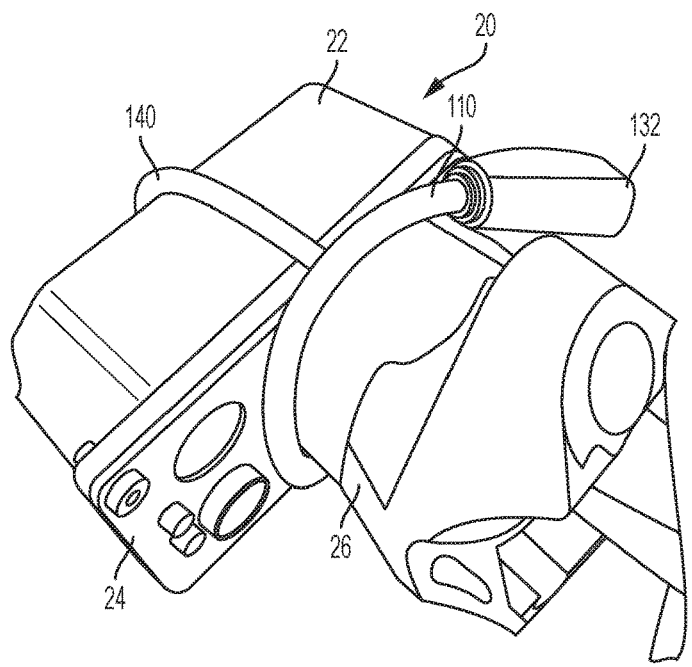
FIG. 5B is a bottom perspective view of the switch cable lock of FIG. 3 installed on a flow or pressure switch.

In use, and with reference to FIGS. 5A and 5B, a user may install cable lock 100 on a covered switch assembly by first sliding second loop portion 140 over the cover 22 so as to position second loop portion 140 at approximately the middle of cover 22, and then wrap first loop portion 110 around fluid line tap 26, bringing head 120 into engagement with receiver 130 at lock assembly 132 to lock cable lock 100 in position on the switch, and such that the closed loop of first loop portion 110 sits immediately below base 24 of switch 20. Once installed, cover 22 may not be removed from switch 20 without first removing cable lock 100, thus preventing unauthorized access to switch 20.

The dimensions of first loop portion 110 and second loop portion 140 may vary so as to closely fit the dimensions of varying switches 20, and adjustment of such dimensions will be well within the level or ordinary skill of persons skilled in the art.

Figure 6:
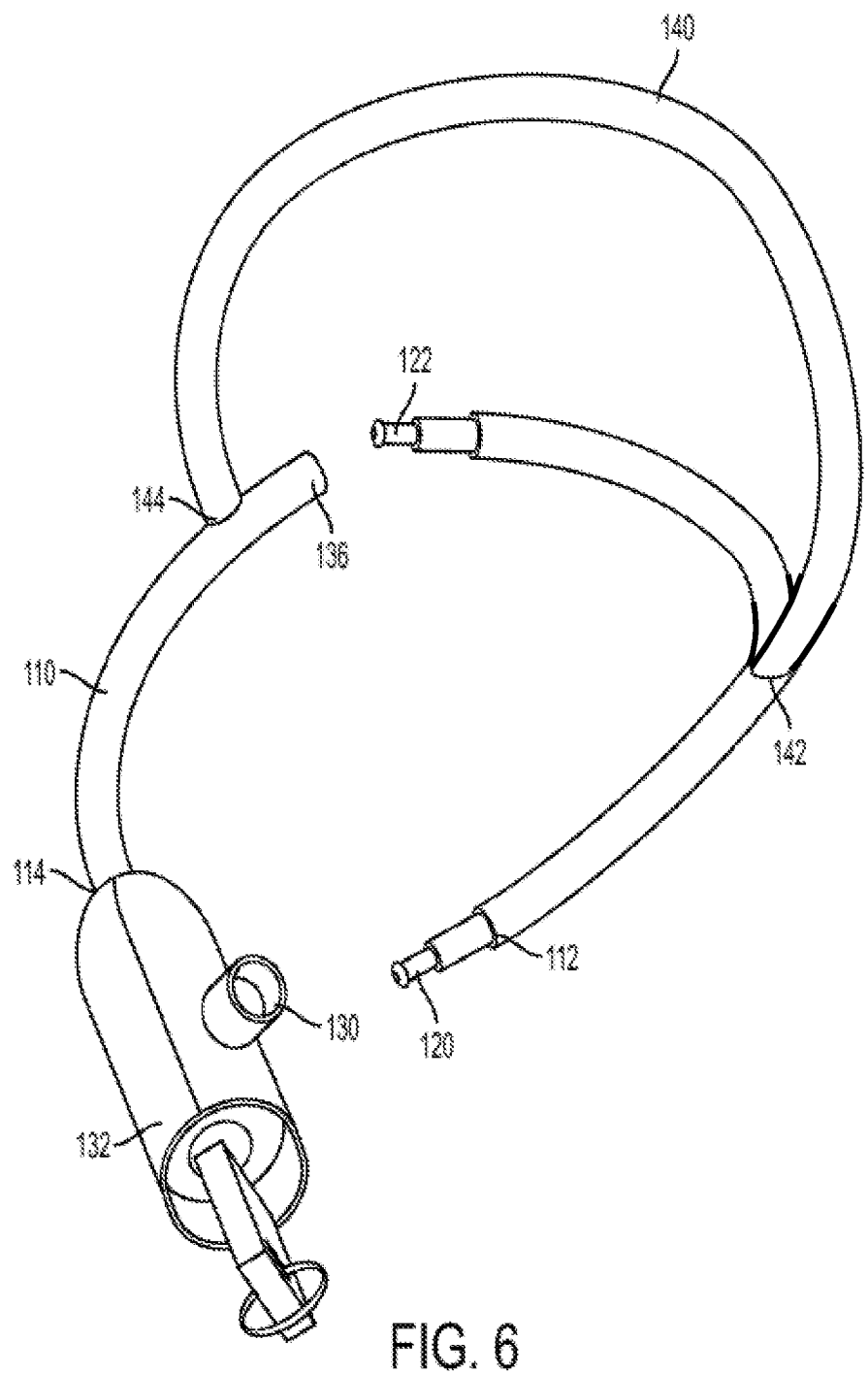
FIG. 6 is a side perspective view of a switch cable lock in accordance with further aspects of an embodiment of the invention.

Optionally, and as shown in FIG. 6, first loop portion 110 may be segmented so as to allow easier installation on a switch 20 having obstructions, such as a wiring harness entering into cover 22 from below base 24. In this case, first loop portion is preferably segmented at a point between first end 142 of second loop 140 and second end 144 of second loop 140, and on the side of first loop portion 110 opposite lock assembly 132. Further, first loop portion includes a second head 122 and a second receiver 136, which second receiver 136 is operated simultaneously with receiver 130 to unlock both of heads 120 and 122 at the same time.

In use, such segmented assembly may be installed in much the same way as the configuration shown in FIGS. 5A and 5B; namely, by first sliding second loop portion 140 over the cover 22 of switch 20, and thereafter wrapping first loop portion 110 around the fluid line tap 26 to bring head 120 into receiver 130, and to bring second head 122 into receiver 136, such that the closed loop of first loop portion 110 sits immediately below base 24 of switch 20.

For each of the configurations described above, second loop portion 140 is permanently affixed to first loop portion 110, such as by welding, cast molding, or such other manufacturing technique that will permanently join the two loop portions together as may occur to those skilled in the art.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A switch cable lock system comprising:
a switch cover having a top surface, two end walls, two side walls, and a rectangular rim extending around a bottom edge of said two end walls and said two side walls, and fasteners for affixing said switch cover over a switch; and
a cable lock comprising:
a first, one-piece, unitary loop portion having a first loop first end, a first loop second end, and a midpoint between said first loop first end and said first loop second end, said first loop portion defining a longitudinal axis extending through said first loop portion, and a lock affixed to said first loop second end, said lock having a lock body extending from said first loop second end and along said longitudinal axis, and said lock body having a receiver mounted in a sidewall of said lock body and extending in a direction perpendicular to said longitudinal axis;

a second, one-piece, unitary loop portion permanently affixed to the first loop portion and situated at a 90° angle to said first loop portion, said second loop portion having a second loop first end attached to said first loop portion at a point between said midpoint and said first loop first end, and said second loop portion having a second loop second end attached to said first loop portion at a point between said midpoint and said first loop second end, wherein said second loop portion is sized to extend over and to be in contact with said switch cover top surface and said switch cover side walls when said first loop portion is closed and positioned below said rectangular rim; and a lock head affixed to said first loop first end and extending outward from said first loop first end along said longitudinal axis, wherein said lock head is insertable into said receiver so as to lock said first loop first end in a position that is at 90° to said first loop second end.

2. The switch cable lock of claim 1, wherein said first loop portion is sized to extend around a fluid line tap head of a flow or pressure switch to which said switch cover is attached when said lock head engages said receiver.

3. The switch cable lock of claim 1, wherein said second loop portion is further sized to extend around said side walls and said top surface of said switch cover while positioning said first loop portion immediately adjacent a base of a switch to which said switch cover is attached.

4. A method of locking a cover of a switch to a base of a switch, comprising the steps of:

providing a switch cover having a top surface, two end walls, two side walls, and a rectangular rim extending around a bottom edge of said two end walls and said two side walls, and fasteners for affixing said switch cover over a switch, and attaching said switch cover over a fluid line tap head of a flow or pressure switch;

providing a switch cable lock comprising:

a first, one-piece, unitary loop portion having a first loop first end, a first loop second end, and a midpoint between said first loop first end and said first loop second end, said first loop portion defining a longitudinal axis extending through said first loop portion, and a lock affixed to said first loop second end, said lock having a lock body extending from said first loop second end and along said longitudinal axis, and said lock body having a receiver mounted in a sidewall of said lock body and extending in a direction perpendicular to said longitudinal axis;

a second, one-piece, unitary loop portion permanently affixed to the first loop portion and situated at a 90° angle to said first loop portion, said second loop portion having a second loop first end attached to said first loop portion at a point between said midpoint and said first loop first end, and said second loop portion having a second loop second end attached to said first loop portion at a point between said midpoint and said first loop second end, wherein said second loop portion is sized to extend over and to be in contact with said switch cover top surface and said switch cover side walls when said first loop portion is closed and positioned below said rectangular rim; and a lock head affixed to said first loop first end and extending outward from said first loop first end along said longitudinal axis, wherein said lock head is insertable into said receiver so as to lock said first loop first end in a position that is at 90° to said first loop second end;

positioning said second loop portion around said switch cover of said flow or pressure switch, such that said second loop portion extends across said top surface and said two side walls of said switch cover;

wrapping said first loop portion around said fluid line tap head of said flow or pressure switch; and locking said first loop portion around said fluid line tap head so that said first loop portion is immediately adjacent a base of said flow or pressure switch.

5. The method of claim 4, wherein said first loop portion is sized to extend around said fluid line tap head when said lock head engages said receiver.

6. The method of claim 4, wherein said second loop portion is further sized to extend around said side walls and said top surface of said switch cover while positioning said first loop portion immediately adjacent said base of said flow or pressure switch.

* * * * *